US011007976B2

(12) United States Patent
Knobloch

(10) Patent No.: US 11,007,976 B2
(45) Date of Patent: May 18, 2021

(54) METHODS AND SYSTEM FOR CONTROLLING THE ACCESS TO AN AUTHENTICATION-DEPENDENT FUNCTION

(71) Applicant: Bayerische Motoren Werke Aktiengesellschaft, Munich (DE)

(72) Inventor: Daniel Knobloch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/650,625

(22) PCT Filed: Oct. 11, 2018

(86) PCT No.: PCT/DE2018/100837
§ 371 (c)(1),
(2) Date: Mar. 25, 2020

(87) PCT Pub. No.: WO2019/072341
PCT Pub. Date: Apr. 18, 2019

(65) Prior Publication Data
US 2020/0238950 A1  Jul. 30, 2020

(30) Foreign Application Priority Data
Oct. 13, 2017  (DE) ..................... 10 2017 218 329.2

(51) Int. Cl.
*G05B 19/00* (2006.01)
*G05B 23/00* (2006.01)
(Continued)

(52) U.S. Cl.
CPC .............. *B60R 25/24* (2013.01); *G06F 21/32* (2013.01); *G06F 21/35* (2013.01); *G06F 21/71* (2013.01);
(Continued)

(58) Field of Classification Search
CPC ......... B60R 25/24; G06F 21/32; G06F 21/35; G06F 21/71; H04L 9/3234; H04L 63/0853; H04L 2209/84
(Continued)

(56) References Cited

U.S. PATENT DOCUMENTS

2006/0294393 A1* 12/2006 Mc Call ................... H04L 9/32
713/186
2013/0259232 A1  10/2013 Petel
(Continued)

FOREIGN PATENT DOCUMENTS

DE  10 2016 012 880 A1  6/2017
DE  10 2016 202 262 A1  8/2017
(Continued)

OTHER PUBLICATIONS

International Search Report (PCT/ISA/210) issued in PCT Application No. PCT/DE2018/100837 dated Dec. 11, 2018 with English translation (six (6) pages).
(Continued)

*Primary Examiner* — Tanmay K Shah
(74) *Attorney, Agent, or Firm* — Crowell & Moring LLP

(57) ABSTRACT

A method and system controls access to an authentication-dependent or authentication-conditional function of a vehicle, via a smart device or smartphone. For the authentication, an authentication feature of the smart device is compared with a stored authentication feature of the device, and authentication is granted if they are identical or sufficiently correspond, the authentication is subjected to an approval process by a user of the smart device, in which it is determined whether the user approves the authentication or not. The authentication and the approval process have at least one channel in a protected region of the smart device and/or are themselves embedded in the protected region,
(Continued)

which lies outside a region of the operating system of the applications and/or the apps of the smart device. The function of the device is executed when there is an authentication and an approval.

8 Claims, 2 Drawing Sheets

(51) Int. Cl.
| | |
|---|---|
| G06F 7/00 | (2006.01) |
| G06F 7/04 | (2006.01) |
| G06K 19/00 | (2006.01) |
| G08B 29/00 | (2006.01) |
| G08C 19/00 | (2006.01) |
| H04B 1/00 | (2006.01) |
| H04B 1/38 | (2015.01) |
| H04B 3/00 | (2006.01) |
| H04Q 9/00 | (2006.01) |
| B60R 25/24 | (2013.01) |
| G06F 21/32 | (2013.01) |
| G06F 21/35 | (2013.01) |
| G06F 21/71 | (2013.01) |
| H04L 9/32 | (2006.01) |
| H04L 29/06 | (2006.01) |

(52) U.S. Cl.
CPC ........ *H04L 9/3234* (2013.01); *H04L 63/0853* (2013.01); *H04L 2209/84* (2013.01)

(58) Field of Classification Search
USPC ....................................................... 340/5.61
See application file for complete search history.

(56) References Cited

U.S. PATENT DOCUMENTS

| | | | |
|---|---|---|---|
| 2014/0337930 A1* | 11/2014 | Hoyos ..................... H04L 63/10 | 726/4 |
| 2015/0120151 A1 | 4/2015 | Akay et al. | |
| 2015/0244718 A1* | 8/2015 | Smets ..................... G06F 21/74 | 726/7 |
| 2015/0381633 A1* | 12/2015 | Grim ..................... H04W 12/06 | 726/4 |
| 2017/0061441 A1* | 3/2017 | Kamal ............ G06Q 20/40145 | |
| 2017/0096123 A1 | 4/2017 | Gennermann et al. | |
| 2018/0181995 A1* | 6/2018 | Burry ..................... H04N 7/183 | |

FOREIGN PATENT DOCUMENTS

| | | |
|---|---|---|
| EP | 2 997 550 B1 | 6/2016 |
| EP | 3 206 151 B1 | 10/2018 |
| WO | WO 2015/176826 A1 | 11/2015 |

OTHER PUBLICATIONS

German-language Written Opinion (PCT/ISA/237) issued in PCT Application No. PCT/DE2018/100837 dated Dec. 11, 2018 (six (6) pages).
German-language Search Report issued in German Application No. 10 2017 218 329.2 dated Oct. 10, 2018 with partial English translation (14 pages).
Cover page of EP 2 997 550 A1 published Mar. 23, 2016 (one (1) page).

* cited by examiner

METHODS AND SYSTEM FOR CONTROLLING THE ACCESS TO AN AUTHENTICATION-DEPENDENT FUNCTION

BACKGROUND AND SUMMARY OF THE INVENTION

The present invention relates to a method and a system for controlling the access to an authentication-dependent or authentication-conditional function of an apparatus, and in particular of a vehicle, by way of a smart device or smartphone.

For the more convenient handling of apparatuses and vehicles, in particular, their functions are often nowadays coupled to smart devices and, in particular, to a smartphone. This also concerns, for example, the access to vehicles and their activation. For the secure call and the secure execution, authentication operations are connected upstream and are intended to enable access only if authorization is proved.

However, such authentication operations can be attacked by third parties, for example using malware and non-secure data transmission channels.

The invention is based on the object of providing a method and a system for controlling the access to an authentication-conditional function of an apparatus, and in particular of a vehicle, which are better protected from attacks by third parties.

The object is achieved in the case of a method for controlling the access to an authentication-conditional function of an apparatus, and alternatively, in the case of a system for controlling the access to an authentication-conditional function of an apparatus, in accordance with the claimed invention.

According to a first aspect, the present invention provides a method for controlling the access to an authentication-dependent or authentication-conditional function of an apparatus, and in particular of a vehicle, by means of a smart device or a smartphone.

In this method, for authentication, an authentication feature of the smart device is compared with a stored authentication feature of the apparatus and authentication is granted if they are identical or sufficiently correspond.

The authentication is subjected to an approval operation by a user of the smart device. In this case, it is determined whether or not the user approves the authentication.

The approval operation has at least one channel in a protected area of the smart device and/or is itself embedded in a or the protected area.

According to the invention, the protected area is outside an area of the operating system, the applications and/or the apps of the smart device.

In particular, the separation of the protected area from the area of the operating system can be distinguished by the fact that suitable hardware measures mean that it is not possible to access storage areas in the protected area from the operating system, the applications and/or the apps of the smart device.

The function of the apparatus is performed if there is authentication and approval.

Possible attacks by third parties are excluded or at least reduced by the procedure according to the invention, namely the requesting and checking of user approval of the authentication operation in a protected area of the smart device. This enables more secure access to functions of apparatuses and of vehicles, in particular.

The smart device is, in particular, a mobile telephone with an extended range of functions, for example a smartphone, and other devices which partially or completely undertake the corresponding functions, for example also smartwatches, smart glasses or other wearables.

The approval operation can be performed in different ways.

It is thus particularly advantageous if the approval operation is carried out before the authentication, for example as requests for permission, and, in particular, authentication is carried out only when there is approval by permission in advance.

Alternatively, it is also possible for the approval operation to be carried out after authentication has already taken place, that is to say, for example, as requests for authorization from the user afterward.

A particularly high degree of security is achieved with the combined authentication and approval by virtue of the fact that, during the approval operation, an approval feature supplied by a user is compared with an approval feature stored in the smart device—in particular in the protected area—and approval is granted if they are identical or sufficiently correspond.

The types or classes of the approval features to be compared can be different.

In one advantageous development of the method according to the invention, during an approval operation, a supplied approval feature and/or a stored approval feature is/are related to a feature or a combination of features from the group of features comprising a biometric feature, a fingerprint, an iris scan, a facial recognition feature, a vocal feature, in particular a voice input, a gesture feature, a facial expression feature, a vein scan of a finger or of a hand, an input via a man-machine interface, an input via a motion sensor, an input via a directly wired hardware key and/or a secure user input via a non-manipulable touch-sensitive interface, in particular in each case in a hardware-secured area of the smart device.

Any desired combinations of these measures are also conceivable.

In principle, the method according to the invention can be used in any desired working apparatuses, the access to which and the function of which are intended to be protected in an unassailable manner.

However, the method is particularly suitable if the access to a vehicle, the activation of a vehicle and/or the performance of a subfunction of the vehicle is/are controlled as the function.

According to an alternative aspect, the present invention also provides a control system in the sense of a system for controlling the access to an authentication-dependent or authentication-conditional function of an apparatus, and in particular of a vehicle, by means of a smart device and, in particular, a smartphone.

The control system is configured to carry out a method according to the invention for controlling the access to an authentication-dependent or authentication-conditional function of an apparatus, and in particular of a vehicle, by means of a smart device and, in particular, a smartphone or to be used in such a method.

In particular, the control system according to the invention is designed with an authentication unit for authentication, which is configured to compare an authentication code of the smart device with a stored authentication code of the apparatus and to grant authentication if they are identical or sufficiently correspond, and an approval unit for an approval operation by a user of the smart device, which is configured to determine whether or not the user approves the authentication.

The approval unit has at least one channel in a protected area of the smart device and/or is itself embedded in a or the protected area.

The protected area is, in particular, outside an area of the operating system, the applications and/or the apps of the smart device.

A functional unit is also formed and can be used to perform the or a selected function of the apparatus when there is authentication and approval.

The authentication unit, the approval unit and the functional unit may each be designed individually or in combination as a software component, a hardware component, in particular an ASIC, or a combination thereof.

Further details, features and advantages of the invention emerge from the following description and the figures.

DETAILED DESCRIPTION OF THE DRAWINGS

Exemplary embodiments and the technical background of the invention are described in detail below with reference to FIGS. 1 and 2. Identical and equivalent and identically or equivalently acting elements and components are denoted using the same reference signs. The detailed description of the designated elements and components is not reproduced each time they appear.

The illustrated features and further properties can be isolated from one another in any desired form and can be combined with one another in any desired manner without departing from the essence of the invention.

Figure 1:
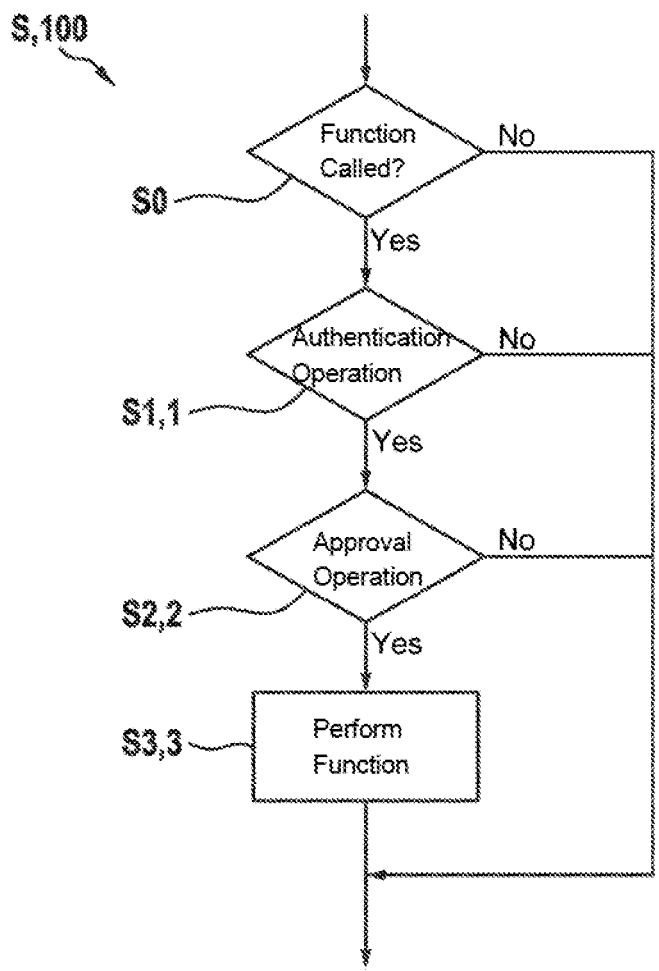
FIG. 1 schematically shows, in the form of a flowchart, an embodiment of the method and system according to the invention.

FIG. 1 schematically shows, in the form of a flowchart, an embodiment of the method S and system 100 according to the invention.

In the embodiment shown in FIG. 1, a step S0 first of all checks whether a function is requested or called. If this is the case (response "yes"), the authentication operation is carried out in the subsequent step S1. For this purpose, a check is carried out in order to determine whether—according to FIG. 2—an authentication feature 15 stored in a storage area 14 in the apparatus 10 corresponds to an authentication feature 25 stored in a storage area 24.

If this is the case (response "yes"), the approval operation is carried out in the subsequent step S2. During this approval operation, an approval feature 28 stored, according to FIG. 2, in a storage area 32 of the smart device 20, for example a smartphone 20', is compared, via a channel 23, with an approval feature 29 supplied to the smart device 20 via an input unit 33.

Figure 2:
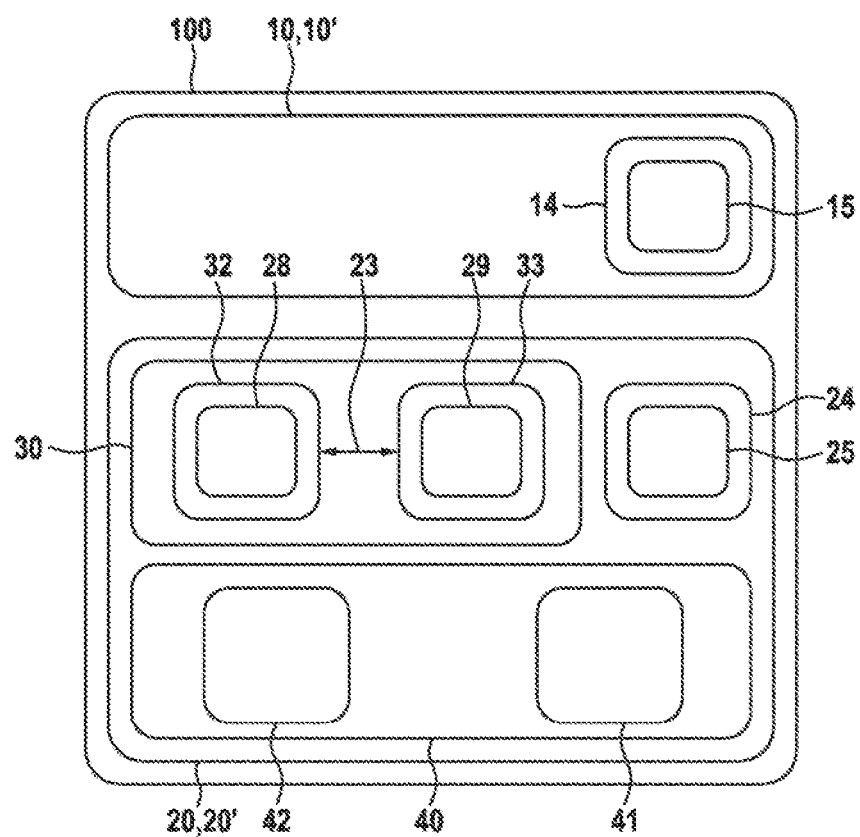
FIG. 2 schematically shows, in the form of a block diagram, an embodiment of the method and system according to the invention.

In the embodiment shown in FIG. 2, the storage area 32 for the stored approval feature 28, the input unit 33 for the supplied approval feature 29 and the channel 23 for the comparison are embedded according to the invention in a secure area 30.

According to the invention, the secure area 30 is outside that area 40 which is designed for the operating system 41, the applications 42, etc. of the smart device 20.

On account of this fact, the approval operation S2 cannot be attacked or can be attacked to a lesser extent by external third parties.

If the approval operation S2 reveals that the stored approval feature 28 and the supplied approval feature 29 are identical or sufficiently correspond (response "yes"), the requested function is performed in step S3.

Otherwise and in the case of all negatively answered queries (response "no"), the method S is terminated and left without performing the requested function.

In the method S according to the invention, the authentication S1 is subsequently checked and possibly authorized in the approval operation S2 in FIG. 1.

In an alternative of the method shown in FIG. 1, the authentication S1 and the approval operation S2 may also be swapped in terms of the order, with the result that permission for authentication S1 is possibly granted in advance.

FIG. 2 schematically shows, in the form of a block diagram, an embodiment of the method S and system 100 according to the invention.

The system 100 is formed by an apparatus 10, for example by a vehicle 10', and a smart device 20, for example a smartphone 20'.

As already mentioned, the apparatus 10 has a storage area 14 for holding an authentication feature 15 stored in the apparatus 10. During the method S, the authentication feature 15 stored in the apparatus 10 and the authentication feature 25 stored in the smart device 20 in the storage area 24 there are compared during the authentication S1.

The smart device 20 has an area 40 for the operating system 41, for applications 42 etc. and a protected area 30 which cannot be attacked and is used to perform the secure approval operation S2.

The secure area 30 comprises a storage area 32 for holding an approval feature 28 stored in the smart device 20, an input area 33 for inputting an approval feature 29 supplied by the user and a channel 23 between them which is used to compare the stored approval feature 28 with the supplied approval feature 29.

These and further features and properties of the present invention are explained further on the basis of the following explanations:

Modern smartphones 20' and other smart devices 20 have an operating system 41 on which all provided functions, programs, applications 42, apps etc. run. The operating system 41, apps 42 running on the latter etc. can be attacked and manipulated by malware and can therefore fundamentally be considered to be non-secure.

In many modern smartphones 20' and other smart devices 20, there are hardware-secured areas 30 which cannot be accessed from the operating system 41; in this context, these are referred to as a secure element and/or as a trusted execution environment, for example. Such areas 30 can also be distinguished by the fact that they run on a separate processor and/or independently of a provided main processor, on which the operating system 41 also runs, and/or are executed in a hardware-supported and isolated execution area of the main processor.

In the sense of the present invention, it can be assumed that a respectively provided executed code can be manipulated with great difficulty in these areas.

Smartphones 20' can be used for vehicle access systems and/or to authenticate engine starts or to start other vehicle functions.

For this purpose, an access secret or a security feature must be securely stored on the smart device 20 and, in particular, the smartphone 20' and can be used for authentication only when the owner also so wishes.

Whereas the secure storage of an access secret is possible in commercially available smartphones 20' by means of various technologies, for example in secure element structures or in a trusted execution environment, it is not so easy to establish the secure authentication approval or authorization in the sense of secure user consent.

If authentication is requested by actuating a knob, key or button in an application 42 or an app, for example, an attacker can attack the function by installing a malicious app on the smart device 20, which app simulates the user's authentication desire.

In this case, the attacker must only extend the authentication channel, and the vehicle 10'—interpreted as an apparatus in the sense of the present invention—can be unlocked with the authentication on the owner's smartphone.

There are various possible ways of obtaining secure user approval for authentication.

Approval can be effected through the spatial vicinity of the smart device 20.

Sensors on the smart device 20 or smartphone 20' can be used to detect that the smart device 20 is in the physical or spatial vicinity of the vehicle. Authentication using the authentication secret is valid only when this is the case.

Alternatively, approval can be effected by means of active action on the level of a user input of the smart device 20.

User interaction is requested via the user interface of the smart device 20, for example a touchscreen. Authentication is carried out in advance using the authentication secret or subsequently authorized only if this has been carried out.

Methods of this type are problematic to the effect that the evaluation of the user approval and the decision regarding whether this approval has been given are carried out on the level of an application 42 or an app or on the level of the operating system 41.

Attacks on the operating system 41 of smart devices 20 and, in particular, of smartphones 20' are known. They can be used to manipulate the operating system or installed applications or apps in such a manner that the corresponding user approval or user authorization can also be performed by an attacker.

An aim of the present invention is to provide user approval methods which cannot be manipulated by such an attack and are used to protect vehicle access or other vehicle functions.

Implementation examples are cited below:

Fingerprint sensors: such sensors are available, as the input area 33, in many smartphones 20' and other smart devices 20. The fingerprint sensor can be implemented in such a manner that the signal which is transmitted by successful detection of the fingerprint to the secure area in the smart device or smartphone cannot be simulated by an attack on the operating system.

In principle, the problem on which the invention is based is solved by using secure user approval or user authorization, which is directly coupled to the secure area 30 in the smart device 20 or smartphone 20', for example in the sense of a secure element or in the sense of a trusted execution environment, for user approval or user authorization in order to prevent an attacker from being able to simulate this.

In this case, a feature of the invention is that the authentication for enabling vehicle access or another vehicle function requires explicit user interaction which provides approval S2 for the authentication S1 in the sense of user consent.

This approval in advance or authorization afterward can be carried out via a mechanism which runs in the secure area 30 of the smart device 20 or smartphone 20', that is to say outside of an operating system 41 and/or the programs, applications 42 or apps.

Implementation possibilities which are known per se for the user approval or user authorization—for example the described fingerprint sensor—can be used for this purpose.

However, other mechanisms which can potentially be implemented in a simpler and more favorable manner in the secure area of the smart device 20 or smartphone 20' or can be connected thereto are also conceivable as part of the invention, for example all man-machine interfaces such as motion sensors in the hardware-secured area, directly wired hardware buttons or hardware keys and concepts of the secure user input, for example non-manipulable and therefore secure user inputs, user inputs via touch-sensitive interfaces, for example via the touch interface or the like. All can be interpreted as an input area 33 in the sense of the present invention.

The use of biometric sensors is also suitable, for example fingerprint sensors, facial recognition, for example FaceID, hand/finger vein scan, iris scan, voice input and more. These can be interpreted as an input area 33 in the sense of the present invention.

The present invention provides the following advantages, inter alia: even in the case of a compromised operating system 41 of a smart device 20 or smartphone 20', the proposed method enables manipulation-proof user approval or user authorization for authentication which is used for vehicle access or a particular vehicle function.

As an addition or alternative, a pin code can also be used via a secure input area 33 as secure user approval or user authorization in a secure area 30.

LIST OF REFERENCE SIGNS

1 Authentication unit
2 Approval unit
3 Functional unit
10 Apparatus
10' Vehicle
14 Storage area
15 (Stored) authentication feature
20 Smart device
20' Smartphone
23 Channel
24 Storage area
25 (Stored) authentication feature
28 Stored approval feature
29 Supplied approval feature
30 Protected area
32 Storage area for stored approval feature
33 Input area for supplied approval feature
40 Area for operating system, applications etc.
41 Operating system
42 Application
100 Control system
S
S0 Function requirement
S1 Authentication operation
S2 Approval operation
S3 Function

What is claimed is:

1. A method for controlling access to an authentication-conditional function of an apparatus via a smart device, comprising:

for authentication, comprising an authentication feature of the smart device with a stored authentication feature of the apparatus, and granting authentication if identical or sufficiently correspond;

subjecting the authentication to an approval operation by a user of the smart device, in which whether or not the user approves the authentication is determined, wherein the approval operation has at least one channel in a protected area of the smart device and/or is itself embedded in the protected area which is outside an area of an operating system, applications and/or apps of the smart device, the function of the apparatus is performed if there is authentication and approval, during the approval operation, an approval feature supplied by a user is compared with an approval feature stored in the smart device in the protected area, and approval is granted if identical or sufficiently correspond, and during the approval operation, a supplied approval feature and a stored approval feature include at least one of an iris scan, an input via a man-machine interface, an input via a motion sensor, an input via a directly wired hardware key and a secure user input via a non-manipulable touch-sensitive interface, in each case in a hardware-secured area of the smart device.

2. The method according to claim 1, wherein
the protected area is characterized in that suitable hardware measures mean that it is not possible to access storage areas in the protected area from the operating system, the applications and/or the apps of the smart device.

3. The method according to claim 1, wherein
the approval operation is carried out before the authentication as requests for permission, and authentication is carried out only when there is approval by permission.

4. The method according to claim 1, wherein
the approval operation is carried out after the authentication as requests for authorization.

5. The method according to claim 1, wherein
during the approval operation, the supplied approval feature and the stored approval feature further include at least one of a biometric feature, a fingerprint, a facial recognition feature, a vocal feature, a voice input, a gesture feature, a facial expression feature, a vein scan of a finger or of a hand, in each case in the hardware-secured area of the smart device.

6. The method according to claim 1, wherein the apparatus is a vehicle, and further wherein
the access to the vehicle, activation of the vehicle and/or performance of a subfunction of the vehicle is controlled as the function.

7. A system for controlling access to an authentication-conditional function of an apparatus via a smart device, comprising:

an authentication unit for authenticating an authentication code of the smart device by comparison with a stored authentication code of the apparatus, wherein authentication is granted if identical or sufficiently correspond, and an approval unit for an approval operation by a user of the smart device, in which whether or not the user approves the authentication is determined, wherein the approval unit has at least one channel in a protected area of the smart device and/or is itself embedded in the protected area which is outside an area of an operating system, applications and/or apps of the smart device, a functional unit is formed and can be used to perform the function of the apparatus when there is authentication and approval, during the approval operation, an approval feature supplied by a user is compared with an approval feature stored in the smart device in the protected area, and approval is granted if identical or sufficiently correspond, and during the approval operation, a supplied approval feature and a stored approval feature include at least one of an iris scan, an input via a man-machine interface, an input via a motion sensor, an input via a directly wired hardware key and a secure user input via a non-manipulable touch-sensitive interface, in each case in a hardware-secured area of the smart device.

8. The system according to claim 7, wherein the apparatus is a vehicle.

* * * * *